Patented Sept. 23, 1952

2,611,805

UNITED STATES PATENT OFFICE 2,611,805

INSTRUMENT FOR LOCATING FAULTS IN ELECTRICAL CABLES AND/OR MEASURING ELECTRICAL CAPACITY

Henry James Osborn and Alan Derek Osborn, Glasgow, Scotland

Application February 25, 1948, Serial No. 10,834
In Great Britain March 5, 1947

1 Claim. (Cl. 175—183)

This invention has reference to instruments for locating open circuit faults in electric cables and/or measuring electrical capacity.

It has been proposed to provide for this purpose instruments which include a Wheatstone bridge. In such instruments an audible signal given through headphones denotes when both sides of the bridge are balanced. In practice it has been found that such indication is far from reliable. It necessitates acute hearing on the part of the operator and any extraneous noise is liable to prevent its satisfactory operation.

The present invention has for its object to provide an instrument which will indicate visually and more accurately the location of an open circuit fault in a faulty cable.

Another object of the invention is to provide an improved instrument for measuring electrical capacity.

The invention will now be described with reference to the annexed drawings wherein.

In the drawings like reference letters denote the same or corresponding parts.

Figures 1, 2, 3, 4:
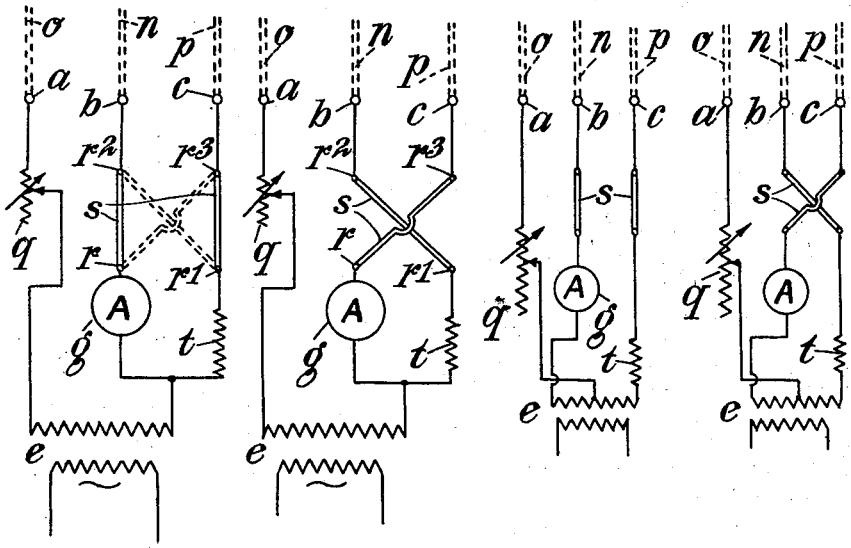
Figure 1 shows an embodiment of the invention with double pole switch, the switch being shown in one position.
Figure 2 is a view similar to Figure 1 but showing the switch in its other position.
Figures 3 and 4 are views of a further embodiment of the invention with double pole switch, Figure 3 showing the switch in one position and Figure 4 showing the switch in its other position.

The instrument is provided with three terminals, $a$, $b$ and $c$.

Terminal $a$ is connected through a variable resistance $q$ to one end of the secondary winding of the transformer $e$, the other end of which is connected through ammeter $g$ to a terminal $r$ of a double pole change-over switch $s$. Further the last mentioned end of the secondary winding is connected to another terminal $r^1$ of the switch through a variable pre-set resistance $t$ having an impedance similar to that of the ammeter $g$. The other two terminals $r^2$ and $r^3$ of the switch are connected respectively to the terminals $b$ and $c$.

The primary winding of the transformer may be energised by means of a vibrator and battery giving an oscillatory circuit, or it may be energised from a public supply or from a valve oscillator circuit the output of which may be at the so called radio or audio frequencies.

In using the instrument to locate a fault in a cable the middle terminal $b$ is connected to a good core $n$ of known length, the first terminal $a$ is connected to a good core or screen or sheath $o$ or connected to earth and the third terminal $c$ is connected to the broken core $p$. Said cores are indicated in dotted lines as they do not form part of the instrument.

The double pole change over switch $s$ is operated as shown in Figure 1 so that the circuit including the first and second terminals $a$ and $b$ and ammeter $g$, secondary winding and the resistance $q$ in series therewith is completed, said resistance and also a resistance in the primary circuit being adjusted so that the instrument reads its highest or gives a reading corresponding to the length of the cable. Thereafter the switch is thrown over as shown in Figure 2 so that the ammeter is included in the alternative circuit including the first and third terminals. The reading on the instrument indicates the length of the broken core in terms relative to that of the known length of the good core indicated by the first reading.

It will be noted that when both readings are taken the circuit including the ammeter $g$ has shunted across same that part of the circuit which is excluded from that containing the ammeter on the operation of the switch. That is, in Figure 1, the part excluded from the circuit containing the ammeter but electrically connected thereto is the resistance $t$ and broken core $p$, and in Figure 2 the excluded part is resistance $t$ and core $n$. In consequence there are no variables affecting one reading and not the other. This results in a high degree of accuracy in locating the fault in a cable.

The instrument may be modified as shown in Figures 3 and 4 by connecting the first terminal $a$ through its adjustable resistance $q$ to a central tapping on the secondary winding of the transformer $e$, one of the end terminals of the transformer being connected to the measuring instrument and the other to the aforesaid resistance having an impedance $t$ similar to that of the measuring instrument. The operation of this modified construction of instrument is similar to that described with reference to Figures 1 and 2.

When either of the instruments is used to compare the unknown capacitance with a known capacitance the known capacitance must be connected between the first and third terminals and the unknown capacitance between the first and second terminals. The instrument is then operated as hereinbefore described.

In both forms of the improved instrument no errors occur in the readings due to an increase in the applied voltage as the loading on the system changes, and also because of changes in the frequency of the system due to the change of loading and to change in power factor (cos $\phi$) due to phase displacement as a result of change of the induction capacity characteristics when changing from one circuit to the other. The difference in capacity is due to the difference in length of the broken and unbroken cores, the capacity of the broken core being of necessity some fraction of that of the unbroken core.

We claim:

An instrument for visibly indicating the location of an open circuit fault in a cable embodying two open circuits having three terminals, one of which is common to both circuits, and which terminals are for connection respectively to a good core, screen, sheath or earth, to a good core of known length and to one end of a broken core, means for producing an oscillatory current by which both circuits can have impressed thereon a similar potential, an ammeter to indicate the current in the said circuits, means to regulate the current flowing through the ammeter, a resistance having an impedance similar to that of the ammeter and a double pole switch which, when in one position, connects in series the first terminal, the means for regulating the current passing through the ammeter, the ammeter and the second terminals, while simultaneously placing the third terminal in series with the said resistance and when reversed placing the first terminal, the means for regulating the current and the third terminal in series and simultaneously connecting the second terminal to said resistance, the arrangement and construction being such that when the three terminals are connected as aforesaid and the switch is in the first mentioned position the current flowing in the circuit containing the ammeter can be adjusted so that the ammeter gives a reading corresponding to the length of the sound core and when it is reversed the reading then indicates the length of the broken core in terms of the length of the sound core, the load on the means for producing the oscillatory current remaining constant in both positions of the switch.

HENRY JAMES OSBORN.
ALAN DEREK OSBORN.

REFERENCES CITED

The following references are of record in the file of this patent:

UNITED STATES PATENTS

| Number | Name | Date |
| --- | --- | --- |
| 754,402 | Wiseman | Mar. 8, 1904 |
| 1,095,284 | Myers | May 5, 1914 |
| 1,983,665 | Hickok | Dec. 11, 1934 |
| 2,068,499 | Mackenzie | Jan. 19, 1937 |
| 2,200,819 | Bohannon | May 14, 1940 |

OTHER REFERENCES

Publication by Laws "Electrical Measurements," Hill Publishing Co., 1917, page 692.